S. J. TODD.
WORK HOLDER FOR MILLING MACHINES.
APPLICATION FILED FEB. 14, 1916.
1,213,300.
Patented Jan. 23, 1917.
3 SHEETS—SHEET 2.
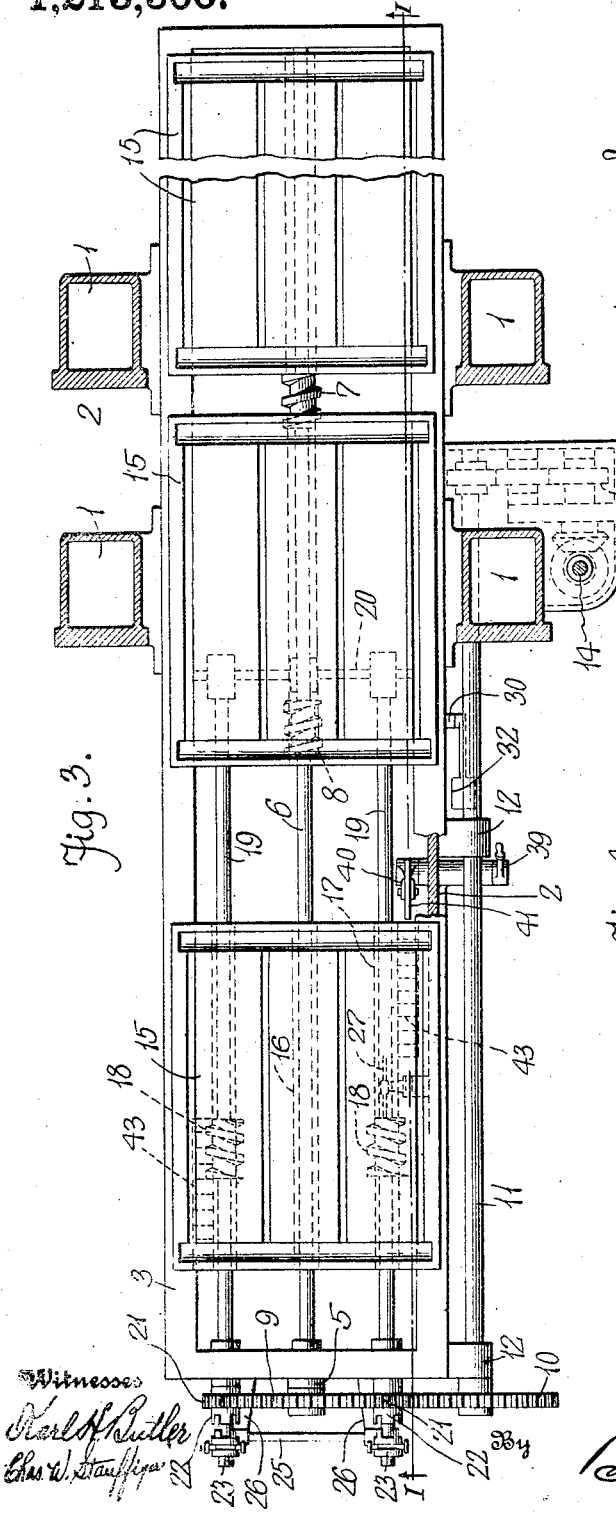
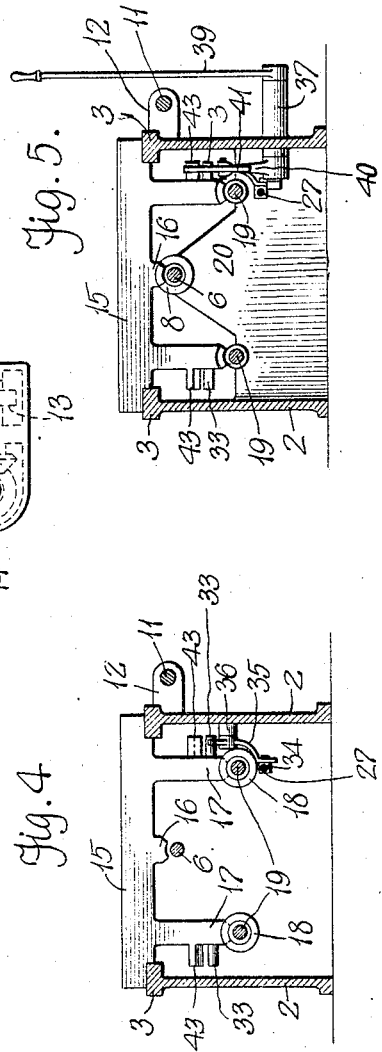
Inventor
Samuel J. Todd S. J. TODD.
WORK HOLDER FOR MILLING MACHINES.
APPLICATION FILED FEB. 14, 1916.
1,213,300.
Patented Jan. 23, 1917
3 SHEETS—SHEET 3.
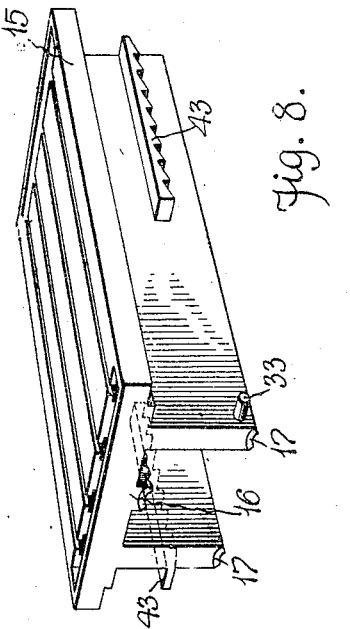
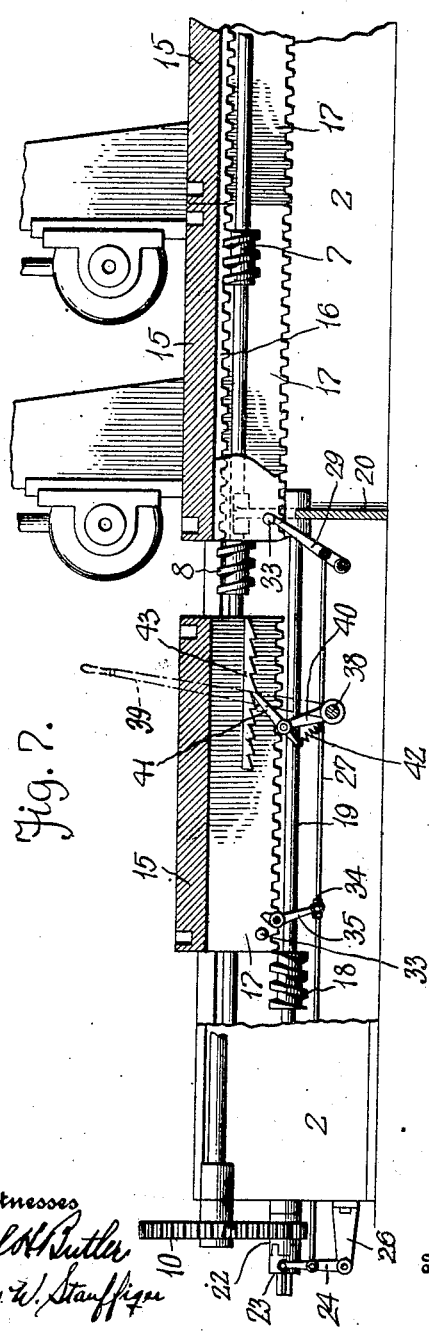
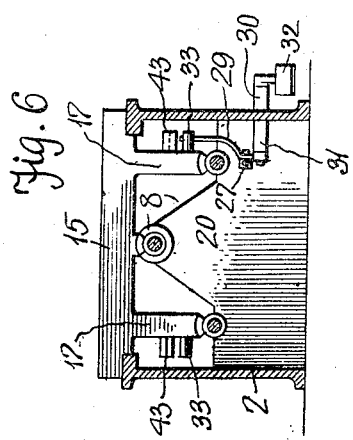
Witnesses
Karl H. Butler
Chas. W. Stauffer
Inventor
Samuel J. Todd.
By
Attorneys

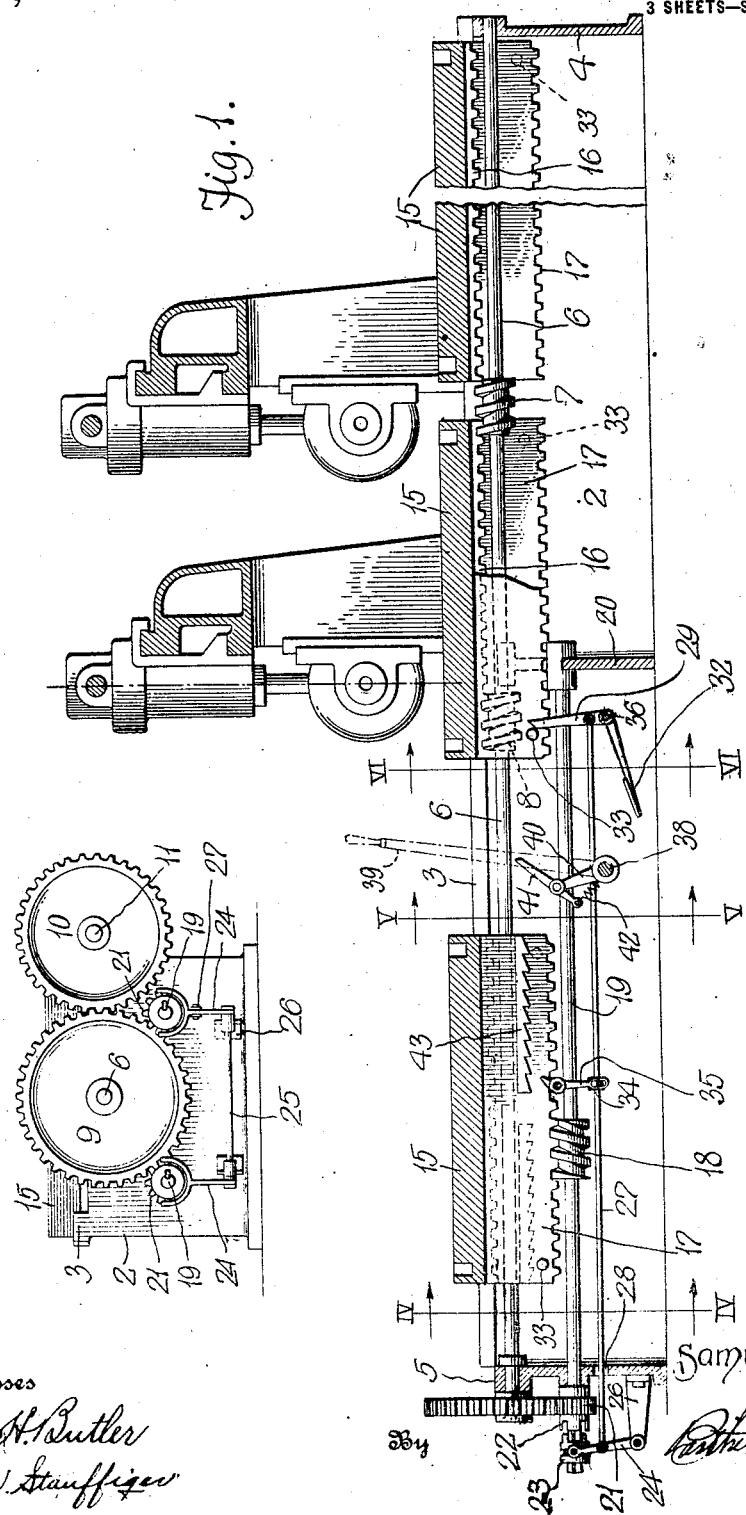

UNITED STATES PATENT OFFICE.

SAMUEL J. TODD, OF HIGHLAND PARK, MICHIGAN, ASSIGNOR OF ONE-HALF TO JONATHAN PALMER, JR., OF DETROIT, MICHIGAN.

WORK-HOLDER FOR MILLING-MACHINES.

1,213,300.   Specification of Letters Patent.   Patented Jan. 23, 1917.

Application filed February 14, 1916. Serial No. 78,109.

*To all whom it may concern:*

Be it known that I, SAMUEL J. TODD, a citizen of the United States of America, residing at Highland Park, in the county of Wayne and State of Michigan, have invented certain new and useful Improvements in Work-Holders for Milling-Machines, of which the following is a specification, reference being had therein to the accompanying drawings.

This invention relates to work holders for milling machines, and my invention aims to furnish a milling machine with individual work holders, which may be repeatedly fed through the machine to obviate the necessity of removing or adjusting pieces of work relative to holders, particularly when a multiplicity of operations are to be performed by a milling machine upon a single piece of work. A machine somewhat of this type is disclosed by patent granted May 4, 1915, No. 1138515, to Samuel J. Todd and Albert M. Humber, wherein individual work holders are adapted to be coupled together to pass through the milling machine. The individual work holders were designed to be moved about on suitable carriages, which together with the coupling means of the individual work holders, was found very satisfactory in connection with small milling machines, but as an improvement in connection with this patent, I have devised individual work holders that can be advantageously used in connection with exceedingly large milling machines.

My invention further aims to furnish a milling machine with novel means for expediting the movement of work holders on the machine, particularly before and after the work has been operated upon. The accelerator by which this is accomplished increases the production of the milling machine and eliminates idle moments for the attendant of such a machine.

My invention will be hereinafter described and then claimed, and reference will now be had to the drawing, wherein—

Figure 1 is a longitudinal sectional view of work holders in connection with a milling machine constructed to handle the same; Fig. 2 is an end view of the milling machine; Fig. 3 is a plan of the work holders as illustrated in Fig. 1; Fig. 4 is a cross sectional view taken on the line IV—IV of Fig. 1; Fig. 5 is a similar view taken on the line V—V of Fig. 1; Fig. 6 is a similar view taken on the line VI—VI of Fig. 1; Fig. 7 is a longitudinal sectional view of work holders in connection with a milling machine, illustrating the work holders in different positions, from that shown in Fig. 1, and Fig. 8 is a perspective view of a detached work holder.

In the drawings, 1 generally denotes a conventional form of milling machine having a bed frame 2 providing longitudinal parallel shares 3. The ends 4 and 5 of the bed frame 2 afford bearings for a central longitudinally disposed main worm shaft 6 provided with worms 7 and 8, each disposed in proximity to the housings of the milling machine. The shaft 6, at the bearing 5, has a large gear wheel 9 measuring with a similar wheel 10 on a counter shaft 11, journaled in bearings 12 at one side of the bed frame 2. This countershaft is revolved through the medium of a train of gears 13 from a power driven shaft 14 forming part of the milling machine.

Slidable upon the shears 3 of the bed frame 2 are individual work holders 15, each work holder having a central longitudinally disposed depending worm rack 16 adapted to mesh with the worms 7 and 8 of the main shaft 6. Each work holder also has depending parallel auxiliary worm racks 17 adapted to mesh with worms 18 on auxiliary shafts 19, journaled in the bearing 5 and an additional bearing 20 in the bed frame 2. The auxiliary shafts 19, at the bearing 5 have small gear wheels 21 meshing with the gear wheel 9 of the main shaft 6 and the small gear wheels 21 are loose on said auxiliary shafts and form part of clutch members 22. Associated with the clutch members 22 are somewhat similar clutch members 23 adapted for rotative continuity with the auxiliary shafts 19 and shifted longitudinally of said shafts by crank yokes 24 mounted upon a rock shaft 25, journaled in brackets 26, carried by the bearing 5.

One of the crank yokes 24 has a connecting rod 27 extending through an opening 28 in the bearing 5. The connecting rod 27 is attached to a curved arm 29 on a rock shaft 30, journaled in an inwardly projecting bearing 31, carried by the bed frame 2, adjacent the bearing 20. The rock shaft 30 extends from the outer side of the bed frame 2 and is provided with a treadle or operating lever 32. The curved arm 29 extends upwardly at the outer side of one of the auxiliary worm racks 17, in the path of projecting pins 33 on the auxiliary worm racks 17 of each work holder, there being a pin on each auxiliary worm rack with one of said pins at one end of the work holder and the other pin at the opposite end of the work holder, thus permitting of the work holders being reversed on the bed frame 2. The connecting rod 27 has a pin 34 extending into the lower slotted end of a bell crank 35 fulcrumed upon an inwardly projecting bearing 36 carried by the bed frame 2, and the short arm of said bell crank is in the path of a pin 33 of a work holder placed upon the forward end of the bed frame 2, as best shown in Fig. 1.

Assuming that the auxiliary worm shafts 19 are driven from the main worm shaft 6 and that a work holder is placed upon the shears 3 with the auxiliary worm racks 17 meshing with the auxiliary worms 18, the work holder is rapidly advanced upon the shears 3, by reason of the worms 18 being driven at a greater speed than the main shaft 6. The work holder will advance to the position shown in Fig. 7, where it is out of mesh with the auxiliary worms 18, and to shift the work holder into position whereby the main worm rack 16 thereof will mesh with the main worm 8 of the shaft 6, a manually operated device is employed, consisting of a ratchet mechanism.

The side of the bed frame 2 is provided with a bearing 37 for a rock shaft 38. On the outer end of the rock shaft 38 is an operating lever 39 and on the inner end of said shaft is a crank 40. The end of the crank is provided with a pivoted pawl 41 having the short arm thereof connected to the crank 40 by a coiled retractile spring 42. The long arm of the pawl 41 is adapted to engage a ratchet rack 43, on the outer side of each auxiliary worm rack 17, as best shown in Fig. 8. The ratchet racks 43 are disposed at opposite ends to the pins 33, and when a work holder rides out of engagement with the auxiliary worms 18, one of the ratchet racks 43 rides into engagement with the pawl 41, as shown in Fig. 7. By oscillating the operating lever 39 the work holder may be advanced on the shears 3, whereby the main worm rack 16 meshes with the main worm 8, and then the work holder is carried through the milling machine by meshing with the worm 7 on the shaft 6.

By equipping the bed frame 2 with an accelerator actuated by the main worm shafts of the milling machine, it is possible to expeditiously move the work holders into position to be fed through the machine. It is necessary to provide the gap between work holders as shown in Fig. 1, to prevent the work holder moved by the auxiliary worms 19 from abutting a work holder moved by the worms 7 and 8. As a safeguard, the clutch members 22 and 23, connecting rod 27, arm 29 and bell crank 35 have been employed for automatically causing a cessation in the operation of the auxiliary worms 18, when a work holder passes out of engagement with said auxiliary worm and when a work holder is about to pass out of engagement with the main worm 8.

In view of the fact that the operation of the milling machine may be discontinued after a work holder has passed through the same, leaving the clutch members 22 and 23 in mesh, the treadle or lever 32 permits of the clutch members 22 and 23 being separated before again placing the milling machine in operation, otherwise, the auxiliary worms 18 would be driven and it would not be good policy to place a work holder in engagement with the same while revolving.

From the foregoing it will be observed that it is unnecessary to couple the work holders together in order to form a train of work holders passing through the milling machine, and that it is unnecessary to depend upon a slow feed for moving work holders prior to passing through the milling machine. The accelerator increases the output of the milling machine by reason of the work holders being expeditiously handled, and by having an attendant personally control the actual feeding of the work holders into the milling machine, there is no danger of the work holders being injured or accidents occurring during the manipulation of the same.

While in the drawing there is illustrated a preferred embodiment of my invention, it is to be understood that the structural elements are susceptible to such variations and modifications as fall within the scope of the appended claims.

What I claim is:—

1. In a milling machine, work holders, a slow feed mechanism for said work holders, and a comparatively fast feed mechanism adapted to move one of said work holders into position to be placed in engagement with said slow feed mechanism while another work holder is being moved by said slow feed mechanism.

2. In a milling machine, work holders, slow feed mechanism for said work holders, a comparatively fast feed mechanism adapted to move said work holders into position to be placed in engagement with said slow feed mechanism, and means adapted to move said work holders from said fast feed mechanism to said slow feed mechanism.

3. In a milling machine having work holders adapted to be repeatedly fed through said machine, an accelerator including an automatic means actuated in advance of a manually actuated means for moving said work holders predetermined distances prior to entering said machine.

4. In a milling machine having work holders adapted to be repeatedly fed through said machine, an accelerator comprising an automatic fast feed mechanism adapted to move said work holders toward said machine, and manually actuated means adapted to move said work holders from said fast feed mechanism to a point to be moved through the machine by the feed mechanism thereof.

5. In a milling machine having work holders and a main feed mechanism for moving said work holders, an auxiliary feed mechanism actuated by said main feed mechanism to move work holders faster than and at the same time as the work holders moved by said main feed mechanism, and means actuated by said work holders to control the operation of said auxiliary feed mechanism.

6. In a milling machine, work holders, a main feed mechanism for said work holders, an auxiliary feed mechanism driven by said main feed mechanism and adapted to move said work holders toward said main feed mechanism at the same time that work holders are being moved by said main feed mechanism, and means actuated by said work holders to cause a cessation in the operation of said auxiliary feed mechanism.

7. In a milling machine, work holders, a main feed mechanism for said work holders, an auxiliary feed mechanism operated by said main feed mechanism adapted to move said work holders a prescribed distance, and means adapted for controlling the operation of said auxiliary feed mechanism relative to said main feed mechanism and adapted to be actuated by a work holder moved by said auxiliary feed mechanism to cause a cessation in the operation of said auxiliary feed mechanism and actuated by a work holder moved by said main feed mechanism to cause said auxiliary feed mechanism to operate in synchronism therewith.

In testimony whereof I affix my signature in presence of two witnesses.

SAMUEL J. TODD.

Witnesses:
KARL H. BUTLER,
ANNA M. DORR.